United States Patent [19]
Lewis

[11] Patent Number: 5,670,942
[45] Date of Patent: Sep. 23, 1997

[54] ILLUMINATION AND COMMUNICATION DEVICE

[75] Inventor: Michael L. Lewis, Panama City, Fla.

[73] Assignee: The United States of America as represented by the Secretary of the Navy, Washington, D.C.

[21] Appl. No.: 354,993

[22] Filed: Dec. 13, 1994

[51] Int. Cl.$^6$ .................................................. G08B 13/18
[52] U.S. Cl. ...................... 340/555; 340/556; 359/172; 359/181; 362/DIG. 800
[58] Field of Search ................................ 340/555, 556; 359/159, 172, 181; 372/18, 19; 362/DIG. 800

[56] References Cited

U.S. PATENT DOCUMENTS

| | | | |
|---|---|---|---|
| 4,717,913 | 1/1988 | Elger | 340/825.54 |
| 4,727,600 | 2/1988 | Avakian | 359/172 |
| 5,289,306 | 2/1994 | Hirohashi et al. | 359/174 |
| 5,416,627 | 5/1995 | Wilmoth | 359/159 |
| 5,424,859 | 6/1995 | Uehara et al. | 359/152 |

FOREIGN PATENT DOCUMENTS

| 0018327 | 1/1989 | Japan | 359/172 |
|---|---|---|---|

*Primary Examiner*—Jeffery Hofsass
*Assistant Examiner*—Julie B. Lieu
*Attorney, Agent, or Firm*—Harvey A. Gilbert; William C. Townsend

[57] ABSTRACT

A transparent and impervious sphere containing encapsulated within the electronics and power source for providing non-visible infrared illumination and communication in various military and non-military applications and denied-access environments. The illumination and communication light source is invisible infrared provided by light emitting diodes mounted near and equally spaced about the circumference of each of two orthogonally intersecting circular-shaped and fully encapsulated printed circuit boards. The autonomous encapsulated power source is rechargeable using an inductively coupled probe introduced to a port in the sphere. An external magnet operates encapsulated magnetic field switches to change mode of operation of the invention, including "ON", "OFF", CONTINUOUS, STROBE, and Morse modes, and to change the Morse coding.

13 Claims, 2 Drawing Sheets

5,670,942

ILLUMINATION AND COMMUNICATION DEVICE

INTRODUCTION

The present invention relates to illumination and communication using non-visible infrared light and, in particular, relates to a self-contained and an environmentally impervious apparatus for producing and introducing spherical illumination and communication surreptitiously in a denied-access area.

BACKGROUND OF THE INVENTION

In special warfare applications, there is a continuing need for improved means for easily introducing a reliable and surreptitious means for providing illumination and communication in a denied-access area with low or no risk of detection. There is an undiminished need in special warfare situations to illuminate targets and other areas of interest, pass messages, or request assistance while in a hostile or potentially hostile area. Additionally, it is imperative that such a means be impervious to environmental influences. Influences include natural such as temperature and pressure, as well as contaminants such as, but not limited to, petrochemicals, oil, acidity, and alkalinity. Thus, such a means must be easily, conveniently, and reliably introducible into the applications environment, must be unnoticeable to the unsuspecting or unaware adversary operatives in that environment, and must be capable of autonomous operation.

Compactness, lightweight, simplicity of operation and ease of deployment are essential characteristics of such an apparatus. In the past, there was no practical, lightweight, and reliable means of introducing and providing the functions described above into a denied-access area.

The present invention is an apparatus for autonomously providing non-visible lighting in a spherical pattern for a variety of illumination and communication applications. The apparatus is a sphere weighing less than one pound that can be adapted quickly to meet mission requirements by making available a constant non-visible infrared light source, non-visible infrared emergency strobe light, or a Morse signaling device by external activation of an internal magnetic switch. The invention can operate without modification at altitudes up to 30,000 feet, at sea level, or at depths greater than or equal to 300 FSW. The invention thus permits the special warfare soldier to pass messages, call for help, or provide necessary illumination without exposure necessitated or resulting from movement or having a visible light source.

SUMMARY OF THE INVENTION

It is an object of the present invention to provide a spherical source of light for illumination and communication for use in a hostile environment.

It is yet an additional object of the present invention to provide a spherical source of non-visible infrared light for illumination and communication applications without exposing the user to enemy detection.

It is yet another object of the present invention to provide a non-visible infrared light source having constant output for illumination and communication applications.

It is further another object of the present invention to provide a spherical source of invisible light in the non-visible infrared range incorporating advanced energy storage and encapsulation techniques.

It is still another object of the present invention to provide a multi-directional source of non-visible infrared light for illumination and communication purposes that can be introduced easily, efficiently, and surreptitiously into denied-access areas.

It is finally another object of the present invention to provide a spherical source of non-visible infrared light for illumination and communications applications packaged as a lightweight sphere capable of operating in the air, on land, or in sub-surface conditions of about six atmospheres for special warfare applications.

The present invention is a small sphere made of a transparent plastic-like material. The sphere encapsulates the functional components of the invention including the battery comprising the power source, the means for charging the battery by coupling to an external power source, a group of twelve high-intensity non-visible infrared light emitting diodes for illumination and communication functions, and the means for selecting and identifying the operating modes of the device.

The invention is lightweight, self-contained, impervious, and easily introduced into various operating environments.

One of the advantages offered by the present invention is the grouping of three types of operations, each operation normally associated with a separate device, into one package that allows all three modes (operations) to be triggered by the same mechanism. The device design, recharging system, and switching mechanics allow the invention to be operated without modification or adaptation at high altitudes, sea level, or extreme depths as quickly as those different environments can be presented. The extreme portability predicated on small size sphere and a weight of less than one pound, make it quite compatible with extended (non-mechanized) field operations. Ease of operation precludes the necessity for extensive training. Normal time of instruction in use is usually just several minutes. Threaded blind inserts located at each pole on the device allows the device to be positioned or streamed in a wide variety of ways. The sealing encapsulation material itself is composed of high impact resistant plastic/polymers. The device has a rechargeable power supply and control electronics sealed within the transparent resin matrix of the ball. Recharging of onboard batteries is accomplished via an inductively coupled dedicated charging unit.

A typical application for this device, in the airborne mode, would be to signal aircraft, parachutists, or ground observers. This signal, due to the three modes, could be either a constant illumination, a request for assistance, or a coded message or any combination of the above. The true uniqueness of this device is demonstrated in the fact that the above suggested applications would apply equally to the ground, water surface, or subsurface operations substituting aircraft for boats or submersibles, as the case may be.

These and other objects, benefits, and advantages of the present invention will be more readily understood when the description of the invention is read in conjunction with the drawings which follow.

DETAILED DESCRIPTION

Figure 3:
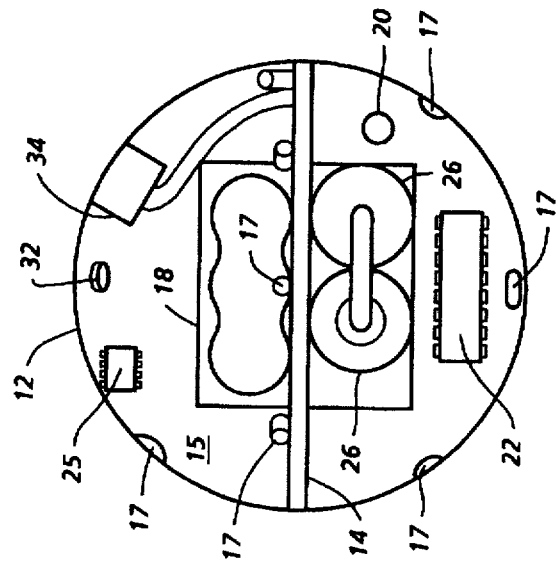
FIG. 3 is a perspective view of the invention rotated 180° about the vertical top to bottom axis from the view depicted in FIG. 2.
Figure 2:
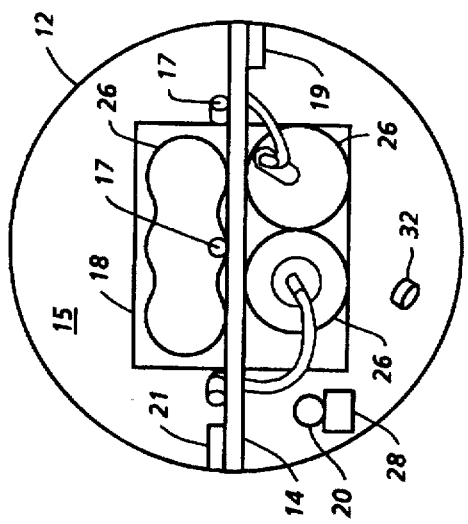
FIG. 2 is a perspective view of the invention rotated 90° in one direction about the vertical top to bottom axis from the view in FIG. 1.
Figure 1:
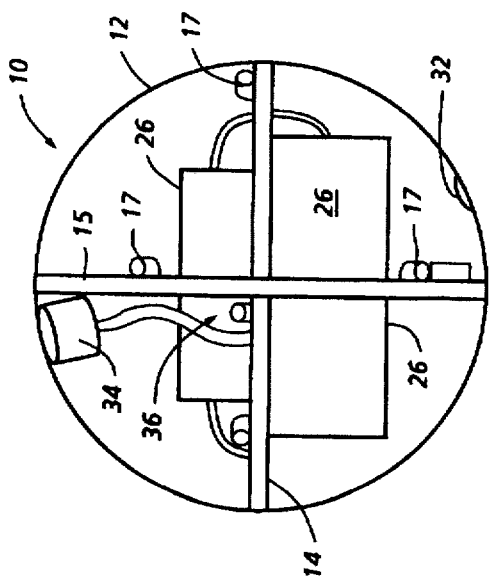
FIG. 1 is a perspective view of the invention.

As depicted in FIGS. 1, 2, and 3, the present invention, the Illumination and Communication Device 10, is a sphere 12 containing a number of functional elements.

In FIG. 1, the two circular-shaped printed circuit (pc) boards 14 and 15 are shown aligned diametrically 90° from each other. This arrangement of the two boards creates a spine upon and about which functional components of the ball 10 are mounted. An opening 18 in the pc board 15 permits the inclusion of the batteries 26 therethrough. The non-visible infrared light emitting diodes 17 are shown affixed to each of the pc boards, 14 and 15. The LEDs 17 are affixed to the boards 14 and 15 and connected to the power and communication circuits on each of said boards. The LEDs 17 are spaced equi-distant from each other about the circumferences of each of the circular-shaped boards 14 and 15.

In FIG. 2, the magnetic field switch 19 (Main) is shown affixed to the board 14 adjacent and connected to the mode circuit 28 which it operates. The switch 19 is physically located near the surface of the sphere 12 so that it may be activated by an external magnet positioned close to the surface of the sphere 12 and in juxtaposition with said switch 19. A similar magnetic field switch 21 (Option) is affixed to the pc board 14 as shown in FIG. 2 for activation by an external magnet to select the next alphabetic character sequentially in the Morse code option of operation selected by switch 19. The letters of the alphabet and their Morse equivalent code is stored in the memory of the microprocessor for sending the next time the Morse operation is selection. The mode indicator 20 is connected to the mode circuit 28 and is located as shown in FIG. 2. The mode indicator 20 lights visibly to show when the non-visible infrared LEDs are illuminating and the mode of operation of the invention. Thus, it lights continuously for continuous LED operation, blinks for strobe operation, and produces a flashing light at intervals determined by the coding of the invention for communication applications. The mode indicator 20 thus permits mode adjustments with visible light. In the "ON" condition or mode, the indicator is green, or other selected color. In the "OFF" mode, the indicator is dark, i.e., not illuminated. Multiple LEDs and various color combinations of LEDs may be used to indicate mode in which the non-visible infrared LEDs are emitting. These are the three major modes of operation of the invention. Each is selected in sequence by repeatedly applying an external magnet to a point in juxtaposition with the switch 19. The three major modes are in addition to an "ON" condition and an "OFF" condition. In a preferred embodiment, the mode indicator was a green LED.

The batteries 18 or other electrical storage means constituting the power supply for the invention 10 are shown in FIG. 2 in groupings of 2 and 3 on opposite sides of the pc board 14. It should be understood that the number and types of batteries or the type and capacity of other electrical storage means used are to be determined by the application and the overall volume and size of the sphere 12 available. Capacitive storage means are an acceptable alternative to batteries commonly used by those skilled in the art. The charging port 34 which penetrates the sphere 12 from its surface is connected to the charging circuit 36 as shown in FIGS. 1 and 3. This circuit employs an operational amplifier chip as the constant current source 25. The charging port 34 contains an inductive charging coupling which acts as a receiver for an externally provided inductive probe.

The microprocessor 22, shown in FIG. 3, is used for programmable communication functions. It is connected to the battery 26, the mode circuit 28, and the illumination devices, i.e., the LEDs 17 and the communication functions. The microprocessor 22 is preprogrammed to turn the LEDs 17 "ON" and "OFF," to control battery charging by the operational amplifier chip, constant current source 25, and to execute the look-up tables stored for Morse or other communications.

There are two blind inserts 32 in radially centered cylindrical penetrations of the surface of the sphere 12 to facilitate deployment of the invention. The operation of the Illumination and Communication Device 10 is described functionally as depicted in FIG. 4.

Figure 4:
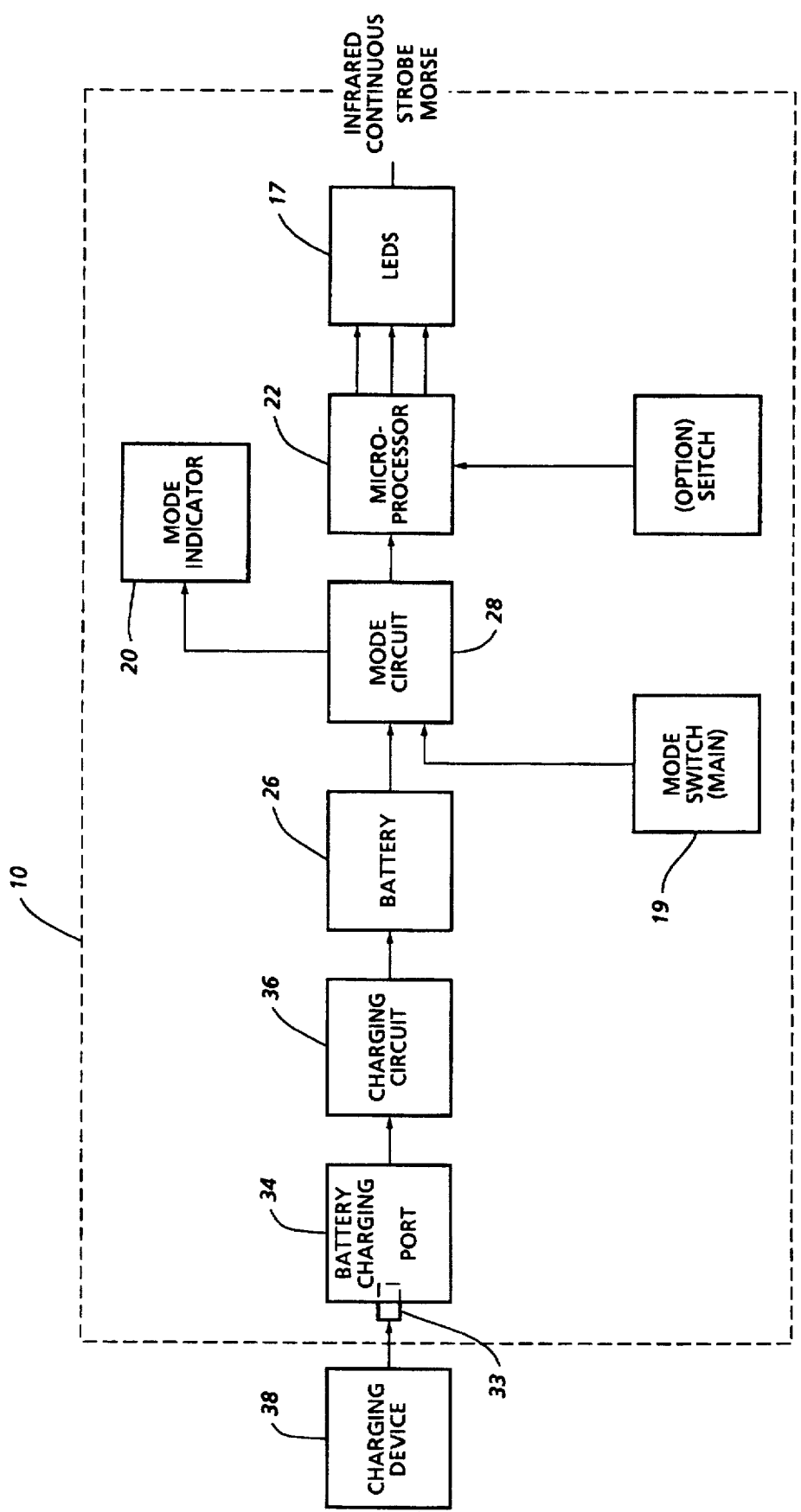
FIG. 4 is a functional block diagram of the invention.

The Illumination and Communication Device 10 is represented by the major functions inside the dashed box in FIG. 4. A charging device 38 is inductively coupled to the ball 10 by way of the inductive probe 33 entering into the charging port 34. The inductively coupled charging of the battery 26 is accomplished via the charging circuit 36 located on the pc board 14 in FIG. 3 and as shown in FIG. 4.

The encapsulated mode switch 19 is activated by bringing an external magnet near the switch which causes the mode circuit 28 to operate and the mode indicator 20 to illuminate indicating the selected mode of operation of the ball 12. The first mode may be continuous illumination. If the mode circuit is activated by an external magnet to the "strobe" mode, the output of the LEDs 17 is strobed non-visible infrared light. If the mode circuit is activated again, the communication or Morse mode is activated. The magnetic field switch 21 operates similarly for user code selection. It should be understood by those skilled in the art that many variations of components included and their wiring can be employed with the present invention. The mode circuit 28 sets the mode of operation into the microprocessor 22 which controls the operation of the LEDs 17.

In a preferred embodiment of the present invention, the sphere is four (4) inches in diameter, however, size can obviously be varied as dictated by application and employment requirements. Five AA nickel Cadmium rechargeable batteries having 700 milliamp-hour capacity were used as the power source. Fully charged, these batteries will operate the invention for approximately 3 hours. A 12-volt DC charging device employing a plug-in adapter for a car cigarette lighter or other charging device is used. Twelve (12) non-visible infrared LEDs were used as the light source for illumination and communication applications. The 8 bit microprocessor was a Motorola PIC16C84. The constant current operational amplifier was a LM10.

A magnetic reed switch is used for the magnetic field switch. The components and their connection can be easily selected for particular applications by those skilled in the art. The pc boards 14 and 15 are fabricated as a support spine as shown in FIGS. 1, 2, and 3. The boards were fabricated from standard FR4 fiberglass pc board material. The clear casting material used to fabricate the sphere 12 surrounding the support spine created by the joinder of pc boards 14 and 15 is a catalytically cured polyester/styrene clear casting compound. Thus fabricated, the invention can be turned on and off without insulting the invention's integrity. Operation is likewise controllable externally via the magnetic reed switch.

What I now claim as my invention is:

1. A multi-mode apparatus for providing spherical illumination and communication after introduction in a denied-access environment, said apparatus comprising:

an environmentally impervious containment means having the capacity to pass light spherically, and comprising a sphere of a transparent solid plastic material prepared from catalytically cured polyester styrene clear casting compound;

a light producing means disposed within said containment means to provide a source of light for spherical passage from said apparatus, said light producing means comprising a plurality of light emitting diodes substantially equally spaced from each other circumferentially about and equidistant from the center of said sphere, at the radial extremities of two orthogonally intersecting planes;

a magnetically operated means for switching from one operating mode of said apparatus to another including the "ON" and "OFF" conditions of said apparatus, said switching means being disposed in said containment means close to the external environment so that an external magnet may be brought in operative juxtaposition with said switching means;

a means for providing autonomous power to said activating and mode changing means and said light producing means, said power providing means being disposed within said containment means; programmable means disposed within said containment means for operating on said light producing means to produce continuous, strobe and coded light output from said light producing means, said programmable means also connected to said power producing means and said activating and mode changing means; and an LED mode indicator and a mode circuit disposed in said containment means, said circuit connected to said switching means and said LED mode indicator.

2. The apparatus of claim 1 wherein said containment means comprises of sphere of a transparent solid plastic material prepared from catalytically cured polyester styrene clear casting compound.

3. The apparatus of claim 2, wherein said light producing means is comprised of a plurality of light emitting diodes substantially equally spaced from each other circumferentially about and equi-distant from the center of said sphere, at the radial extremities of two orthogonally intersecting planes.

4. The apparatus of claim 1 wherein said magnetically operated switching means is selected from the group consisting of a magnetic reed switch and a Hall effect device.

5. The apparatus of claim 1 wherein said means for providing autonomous power comprises:

an electrical storage means affixed within said containment means;

a means connected to said storage means within said containment means and extending outward therefrom for coupling externally supplied power to said storage means for charging and recharging thereof;

external means for coupling said externally supplied power to said internal coupling means;

a means for indicating status of charge of said storage means, said indicating means operatively disposed in said containment means and connected between said internal coupling means and said storage means.

6. The apparatus of claim 5 wherein said internal coupling means is inductive.

7. A multi-mode apparatus for providing spherical illumination and communication after introduction in a denied-access environment, said apparatus comprising:

an environmentally impervious containment means having the capacity to pass light spherically, and comprising a sphere of a transparent solid plastic material prepared from catalytically cured polyester styrene clear casting compound;

a spine of two circular-shaped printed circuit boards, said boards intersecting orthogonally along a diameter of each and fully contained within the encapsulating material of said sphere;

a light producing means disposed within said sphere to provide a source of light for spherical passage from said apparatus, said light producing means comprising a plurality of light emitting diodes substantially equally spaced from each other circumferentially about and equi-distant from the center of said sphere, at the radial extremities of two orthogonally intersecting planes comprising said spine;

a means for providing autonomous power to said activating and mode changing means and said light producing means, said power providing means being disposed within said sphere;

a charging circuit connected to said power providing means internal to said sphere and having a coupling port penetrating the surface of said sphere for coupling external power to said charging circuit for recharging said power providing means;

a magnetically operated means for activating and changing the mode of operation of said apparatus by switching from one operating mode of said apparatus to another including the "ON" and "OFF" conditions of said apparatus, said switching means being disposed in said containment means close to the external environment so that an external magnet may be brought in operative juxtaposition with said switching means; and.

programmable means disposed within said sphere for operating on said light producing means to produce continuous, strobe and coded light output from said light producing means, said programmable means also connected to said power producing means and said activating and mode changing means; and an LED mode indicator and a mode circuit disposed in said sphere, said circuit connected to said switching means and said LED mode indicator.

8. The apparatus of claim 7 wherein said light producing devices are non-visible infrared producing light emitting diodes.

9. The apparatus of claim 8 further comprising a means connected to said light emitting diodes for indicating that said diodes are receiving power for operation and the mode of operation of said diodes, including continuous, strobe, and coded operation.

10. The apparatus of claim 7 wherein said storage-type power source is selected from the group consisting of a storage type battery and a capacitive type storage device.

11. The apparatus of claim 7 wherein said charging circuit includes a constant current supply means.

12. The apparatus of claim 7 wherein said coupling port includes a means for inductively coupling external power to said charging circuit.

13. The apparatus of claim 7 wherein said charging circuit further comprises a means for indicating that charging is occurring.

* * * * *